United States Patent
Gaugler

(10) Patent No.: US 9,178,251 B2
(45) Date of Patent: Nov. 3, 2015

(54) BUTTON CELL HAVING BURSTING PROTECTION

(75) Inventor: Winfried Gaugler, Ellwangen-Eigenzell (DE)

(73) Assignee: VARTA Microbattery GmbH (DE)

( * ) Notice: Subject to any disclaimer, the term of this patent is extended or adjusted under 35 U.S.C. 154(b) by 0 days.

(21) Appl. No.: 13/879,642

(22) PCT Filed: Sep. 20, 2011

(86) PCT No.: PCT/EP2011/066327
§ 371 (c)(1),
(2), (4) Date: Apr. 16, 2013

(87) PCT Pub. No.: WO2012/048995
PCT Pub. Date: Apr. 19, 2012

(65) Prior Publication Data
US 2013/0216881 A1    Aug. 22, 2013

(30) Foreign Application Priority Data

Oct. 16, 2010    (DE) .......................... 10 2010 042 548

(51) Int. Cl.
| | |
|---|---|
| *H01M 10/42* | (2006.01) |
| *H01M 2/02* | (2006.01) |
| *H01M 2/12* | (2006.01) |
| *H01M 2/04* | (2006.01) |
| *H01M 10/0525* | (2010.01) |
| *H01M 10/0587* | (2010.01) |

(52) U.S. Cl.
CPC ........ *H01M 10/4235* (2013.01); *H01M 2/0222* (2013.01); *H01M 2/12* (2013.01); *H01M 2/0465* (2013.01); *H01M 10/0525* (2013.01); *H01M 10/0587* (2013.01)

(58) Field of Classification Search
None
See application file for complete search history.

(56) References Cited

U.S. PATENT DOCUMENTS

| | | | |
|---|---|---|---|
| 6,468,691 B1* | 10/2002 | Malay et al. ................... | 429/174 |
| 2003/0211387 A1 | 11/2003 | Braunger et al. | |
| 2006/0183020 A1* | 8/2006 | Davidson et al. ............. | 429/174 |
| 2006/0188779 A1* | 8/2006 | Yoppolo et al. ............... | 429/174 |
| 2008/0075995 A1* | 3/2008 | Janmey ........................... | 429/27 |
| 2008/0248384 A1* | 10/2008 | Yabushita et al. ............ | 429/185 |
| 2009/0325062 A1* | 12/2009 | Brenner et al. ............... | 429/174 |
| 2010/0247984 A1 | 9/2010 | Yamashita et al. | |
| 2011/0091753 A1* | 4/2011 | Wang et al. ..................... | 429/94 |

FOREIGN PATENT DOCUMENTS

| | | |
|---|---|---|
| CN | 1447458 | 10/2003 |
| DE | 1116488 | 5/1962 |

(Continued)

OTHER PUBLICATIONS

Office Action issued Jun. 15, 2011 in co-pending German application.

*Primary Examiner* — Patrick Ryan
*Assistant Examiner* — Jose Colucci Rios
(74) *Attorney, Agent, or Firm* — DLA Piper LLP (US)

(57) ABSTRACT

A button cell has a housing closed in a liquid-tight manner including a cup, cover and seal, the cell cup having a base, circumferential casing, an edge area connecting the base and casing, and an end cut edge, the cell cover has a base, a circumferential casing, an edge area connecting the base and casing, and an end cut edge, the cover is inserted into the cup with the cut edge in front such that the casing of the cup and casing of the cover at least partially overlap and form a double-walled casing area, the seal is arranged between the cup and cover between the overlapping casing area such that they are isolated from one another, and at least one hole passes through the casing of the cup in the area which overlaps the casing of the cover.

12 Claims, 3 Drawing Sheets

(56) References Cited

FOREIGN PATENT DOCUMENTS

| DE | 3113309 | 10/1982 |
| DE | 19647593 A1 | 5/1998 |
| DE | 10313830 | 9/2004 |
| DE | 10 2009 017 514.8 | 10/2010 |
| EP | 0322872 A1 | 7/1989 |
| WO | 2010/089152 | 8/2010 |

* cited by examiner

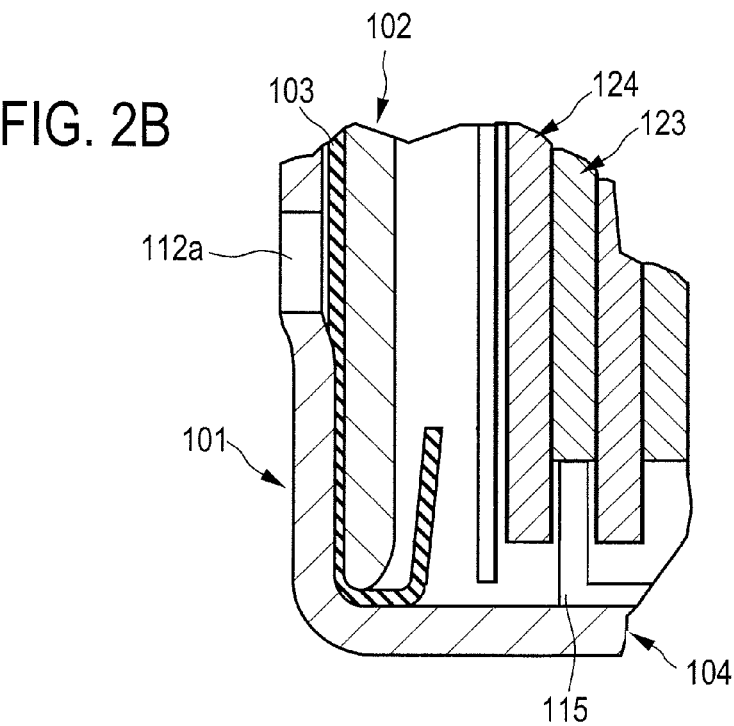
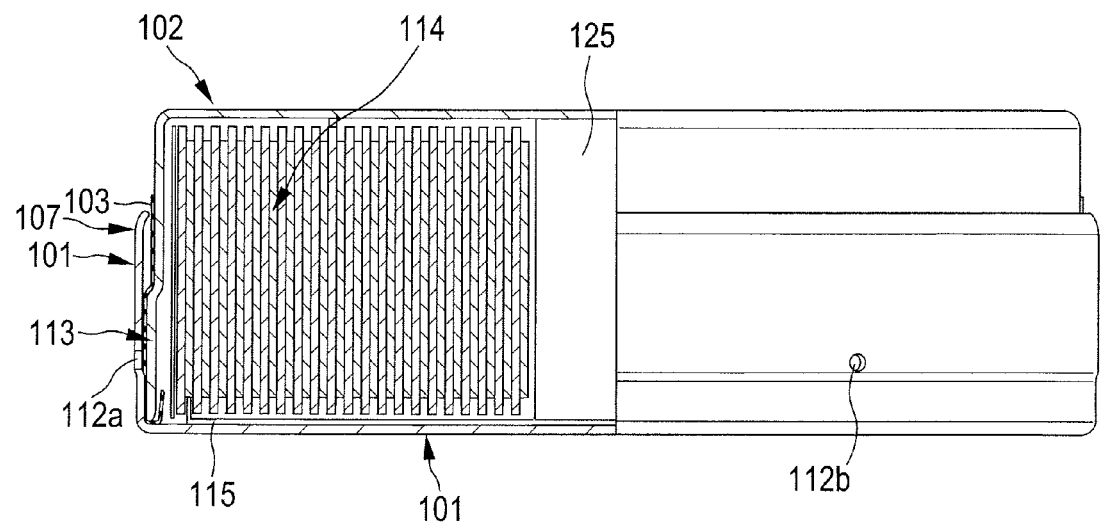

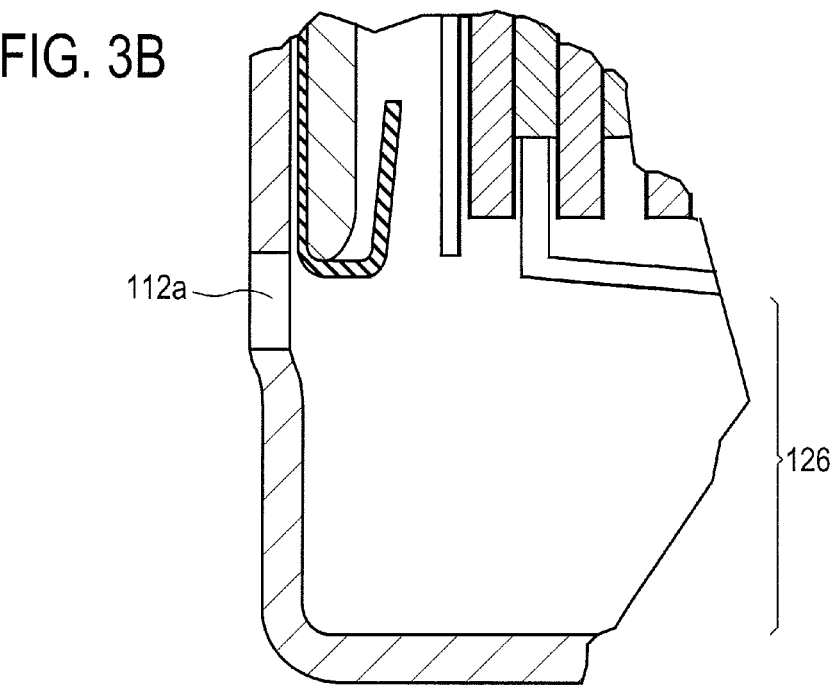
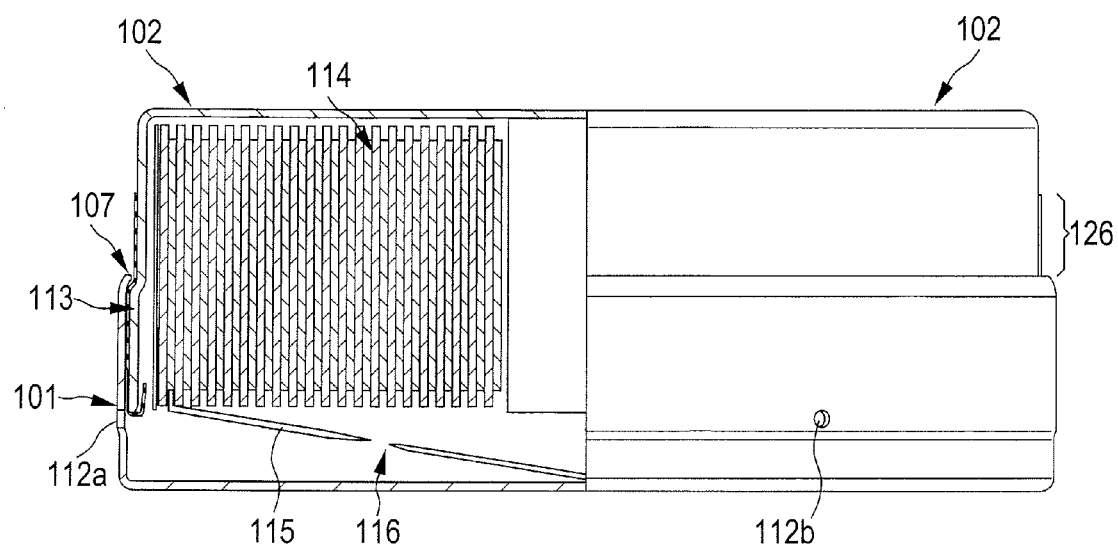

BUTTON CELL HAVING BURSTING PROTECTION

TECHNICAL FIELD

This disclosure relates to a button cell having a housing which is closed in a liquid-tight manner, comprising a cell cup, a cell cover and a seal.

BACKGROUND

Button cells normally have a housing comprising two housing half parts, a cell cup and a cell cover. By way of example, these can be produced from nickel-plated deep-drawn sheet metal as stamped and drawn parts. The cell cup is normally of positive polarity, and the cell cover of negative polarity. The housing may contain widely differing electrochemical systems, for example, zinc/manganese dioxide, primary and secondary lithium-ion systems or secondary systems such as nickel/cadmium or nickel/metal hydride.

Traditionally, button cells are closed in a liquid-tight manner by peening the edge of the cell cup over the edge of the cell cover in conjunction with a plastic ring arranged between the cell cup and the cell cover and is at the same time used as a sealing element and for electrical isolation of the cell cup and of the cell cover. Button cells such as these are described, for example, in DE 31 13 309.

Alternatively, it is also possible to manufacture button cells in which the cell cup and cell cover are held together in the axial direction exclusively by a force fit and which correspondingly do not have a beaded-over cup edge. Button cells such as these and their production are described, for example, in WO 2010/089152 A1 and in DE 10 2009 017 514.8. As can be seen from WO 2010/089152 A1, the housings without a beaded-over cup edge are particularly suitable for secondary lithium-ion systems in which the electrodes are constructed in the form of a preferably spiral winding composed of flat electrode and separator layers.

Lithium-ion systems may, for example, have a lithium metal-oxide compound as a cathode, and a lithium-ion intercalating material such as graphite as an anode. During the charging process, lithium ions are moved out of the lithium metal-oxide compound and intercalated in the anode. In the event of overcharging, it is possible for more lithium ions to be moved out than can be absorbed by the anode. As a consequence, metallic lithium is deposited on the surface of the anode. If the charging process is continued further and the voltage is correspondingly increased further, in particular to a level of considerably more than 4.2 V, then components of the electrolyte may decompose and lead to severe gassing from the cell. Furthermore, the structure of the lithium metal-oxide compound becomes evermore unstable as removal of the lithium progresses, until, in the end, it collapses, with oxygen being released. These processes lead to severe heating of the cell and possibly even to explosive combustion.

To ensure the operational safety of button cells using lithium-ion systems, it is not unusual for the housings of the cells to be provided with bursting membranes for this reason. By way of example, a button cell having a housing such as this is known from DE 103 13 830 A1.

It is also known for safety electronics to be used to enhance the operational safety of lithium-ion systems, which safety electronics monitor the charging and discharging process and, furthermore, offer protection against incorrect handling, in particular even against external shorts. Alternatively or additionally, lithium-ion systems may also be provided with fuse links which blow above a defined temperature and can suddenly interrupt a charging or discharging process. However, fuse links have the disadvantage that, in some circumstances, they may also be blown by the supply of external heat without there having been any specific risk of fire or explosion. Electronic fuses are therefore generally preferred. However, these are comparatively expensive.

It could therefore be helpful to provide a button cell, in particular based on a secondary lithium-ion system, which has safety tripping which can ensure the operational safety of the button cell.

SUMMARY

I provide a button cell having a housing closed in a liquid-tight manner including a cell cup, a cell cover and a seal, wherein the cell cup has a base, a circumferential casing, an edge area connecting the base and the casing, and an end cut edge, the cell cover has a base, a circumferential casing, an edge area connecting the base and the casing, and an end cut edge, the cell cover is inserted into the cell cup with the cut edge in front such that the casing of the cell cup and the casing of the cell cover at least partially overlap and form a circumferential double-walled casing area, the seal is arranged between the cell cup and the cell cover between the overlapping casing areas such that they are isolated from one another, and at least one hole passes through the casing of the cell cup in the area which overlaps the casing of the cell cover.

BRIEF DESCRIPTION OF THE DRAWINGS

FIG. 2 schematically illustrates an example of my button cell.

FIG. 3 schematically illustrates the button cell as illustrated in FIG. 2, after overcharging has been deliberately brought about.

DETAILED DESCRIPTION

Figure 1A:
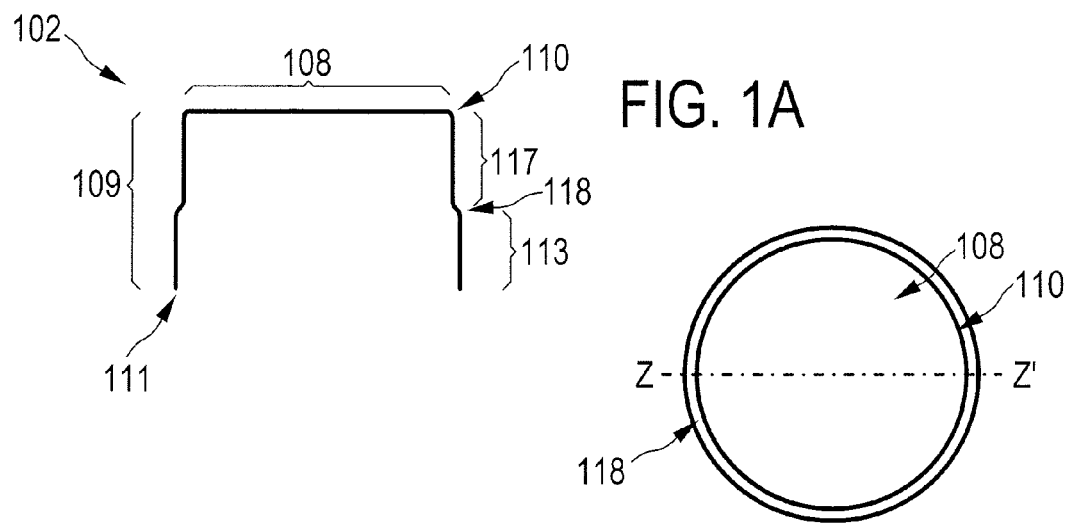
FIG. 1 schematically illustrates a cell cover suitable for a button cell and a cell cup which fits it, as well as a housing composed of these two housing half parts.

My button cells have a housing comprising two housing half parts, a cell cup and a cell cover. The cell cup and the cell cover connect to one another via a seal and each have a base, a circumferential casing, an edge area which connects the base and the casing, and an end cut edge. The latter forms the opening edge of the housing half parts.

The base of the cell cup and the base of the cell cover are preferably each planar, and are preferably circular (or else possibly oval). The casing of the cell cup and the casing of the cell cover can preferably be described as annular segments of a hollow cylinder with a circular cross section (or else possibly an oval cross section). Their diameters preferably correspond either exactly to those of the associated circular base, or are greater than them. In general, the casings of the cell cup and cell cover are aligned orthogonally with respect to the associated bases.

The edge areas of the cell cup and cell cover form the junction between the casing and the associated base of a cell cover or of a cell cup. They comprise the areas of the cell cup and cell cover not located on the same plane as the respective base, but are not yet part of the associated casing, that is to say, in particular, they have a diameter less than the diameter of the adjacent casing. The edge areas may be round or else may be in the form of a sharp edge.

The housing half parts are preferably manufactured from metallic materials such as nickel-plated steel or sheet metal.

Furthermore, trimetals are particularly suitable, for example, with the sequence nickel, steel (or stainless steel) and copper (from the outside inwards).

The cell cover of the button cell is inserted into the cell cup with the cut edge in front such that the casing of the cell cup and the casing of the cell cover overlap at least partially and form a circumferential double-walled casing area. The size of the overlap area and the ratio of the overlapping area to non-overlapping areas is in this case governed by the respective height of the casings of the cell cup and cell cover, and by the depth of insertion.

The seal is arranged between the cell cup and the cell cover, in particular between the overlapping casings of the cell cup and cell cover such that they are isolated from one another. The seal is preferably a film seal, in particular one as described in DE 196 47 593. It is particularly preferable to use film seals composed of a thermoplastic. Polyamide or polyether ether ketone is particularly suitable as a material.

In particular, my button cells are distinguished in that at least one hole passes through the casing of the cell cup in the area which overlaps the casing of the cell cover.

By way of example, the at least one hole may be a hole manufactured by rotating tools or alternative processes such as drill erosion or laser drilling. However, in principle, it is irrelevant how the hole is introduced into the casing of the cell cup. In contrast, its size is more important. The at least one hole preferably has a diameter of at most up to 2 mm, in particular a diameter of 10 μm to 500 μm.

Preferably, the cell cover is inserted into the cell cup so far that the cut edge of the cell cover is seated on the base of the cell cup. If required, the cut edge in this case rests on a supporting ring inserted into the cell cup.

The heights of the casings of the cell cup and cell cover are preferably matched to one another such that when the cell cover has been inserted completely into the cell cup, it is impossible to bend the cut edge of the cell cup inwardly over the edge area of the cell cover which has been inserted into the cell cup. Even when the cell cover has been inserted completely into the cell cup, the cut edge of the cell cup preferably rests on the outer wall of the casing of the cell cover. The cut edge of the cell cup therefore cannot be peened over the edge area of the cell cover.

Instead, the casing of the cell cup preferably has an essentially constant internal diameter in the direction of the cut edge. Preferably, the cell cup, the cell cover and the seal are therefore held together essentially only by adhesion force.

My button cells are correspondingly preferably a cell without a beaded-over cup edge, as is described in WO 2010/089152 A1. The subject matter of WO 2010/089152 A1 is hereby incorporated by reference into the content of this description.

All the features of the button cell described in WO 2010/089152 A1 can be implemented individually or in combination, as well, in my button cells, both with respect to the housing and the electrodes and other components arranged within the housing. My button cells are particularly preferably a button cell having a wound electrode as described in WO 2010/089152 A1.

It is preferable for the casing of the cell cup to completely overlap the casing of the cell cover. It is preferable for the casing of the cell cover to have an area or a segment which does not overlap the casing of the cell cup.

Correspondingly, the casing of the cell cup preferably has a shorter height than the casing of the cell cover. The height of the casing of the cell cup is between 35 to 95%, in particular 50% to 75%, of the height of the cell cover.

Preferably, the casing of the cell cover also has an essentially constant internal diameter in the direction of its cut edge.

Particularly preferably, the cell cup of my button cells have a cut edge curved radially inwardly, such that the internal diameter of the casing of the cell cup decreases towards the cut edge. The casing of the cell cup therefore tapers towards the cut edge.

The button cells may be characterized in that the casing of the cell cover comprises a preferably circumferential segment in the area which overlaps the casing of the cell cup, which segment widens radially outwardly and whose external diameter is greater than the internal diameter of the casing of the cell cup in the area of the cut edge which is curved inwardly.

This design has the consequence that the cell cover inserted into the cell cup is no longer connected to it only via adhesion forces (via the seal which is arranged between the two half parts). In fact, in this instance, the two half parts also connect to one another in an interlocking manner in the axial direction. If overpressure occurs in the interior of the housing of the button cell, then, provided that the forces which occur exceed adhesion forces between the cell cup and the cell cover, this can lead to the cell cover being pushed out of the cell cup. This is no longer possible in the case of cells having a cell cup with the cut edge and is curved inwardly and a cell cover having the segment which has been widened radially outwardly. The pressure can force the cell cover out of the cell cup only until that segment of the cell cover which widens radially outwardly meets the cut edge which is curved inwardly. They can then slide further apart from one another in the axial direction only by deformation of the cell cup and/or of the cell cover.

The width of the widened segment is preferably 10% to 90%, in particular 30% to 70%, of the height of the casing of the cell cover.

It is also possible for the width of the widened segment to be 5% to 95%, preferably 25% to 75%, of the height of the overlapping (double-walled) area formed by the casings of the cell cup and the cell cover when the cell cover has been inserted completely into the cell cup.

Particularly preferably, that segment which widens radially outwardly is an end segment extending as far as the cut edge of the cell cover or starting from the cut edge in the direction of the base of the cell cover.

A segment such as this, which does not extend over the complete overlapping area between the cell cup and the cell cover, ensures that the cell cover which has been inserted into the cell cup can move to a limited extent in the axial direction. This means that an internal pressure greater than the adhesion force between the cell cup and the cell cover can force the two housing half parts apart from one another in the axial direction until the process of them sliding out of one another is stopped, because that segment of the cell cover which widens radially outwards meets the cut edge, which is curved inwardly, of the cell cup. As a consequence, the casings of the cell cup and cell cover no longer overlap in the lower part of the cup. Forcing the two housing half parts apart from one another reduces the size of the circumferential double-walled casing area mentioned above. A circumferential segment of the cell cup towards the cell interior is exposed underneath the double-walled area.

It is preferable for the at least one hole to be arranged in this free segment of the cell cup. This is because the at least one hole is exposed when the cell cup and the cell cover slide out of one another, thus making it possible to dissipate any overpressure within the cell. The housing half parts which can move with respect to one another act like a safety valve, in conjunction with the at least one hole.

The at least one hole is particularly preferably arranged, starting from the base of the cell cup, at a height of up to 90%, preferably of up to 70%, in particular of up to 30%, of the overall height of the casing.

As has already been mentioned, within the housing, the button cells preferably have an electrode-separator assembly having at least one positive and at least one negative electrode in the form of a winding. It is preferable for the positive electrode to connect via an output conductor to the housing cup, in particular to the base of the housing cup, wherein the output conductor has at least one predetermined breaking point. If the cell cover together with the electrode-separating winding arranged therein is forced out of the cell cup in the event of the predetermined breaking point breaking within the housing, then the output conductor can be mechanically destroyed at the predetermined breaking point such that it is possible to prevent an undesirable further current flow.

By way of example, a predetermined breaking point may consist of a weakened material area, a thinned area or a notch at one or more points on the output conductor. The output conductor can preferably be broken through or destroyed by mechanical forces at the predetermined breaking point more easily than in other areas.

Those advantages and further advantages will also become evident from the description of the drawings. In this case, the individual features may be implemented independently or in combination with one another. The described examples serve only for explanation and improved understanding and should in no way be understood as being restrictive.

FIG. 1A schematically illustrates the cell cover 102 on the one hand in the form of a plan view from above (of the base of the cell cover 102) and on the other hand in the form of a cross-sectional illustration (section along the line Z-Z'). The cell cover 102 has a circular, planar base 108 and the cylindrical casing 109 with a circular cross section. The edge area 110 forms the junction between the casing 109 and the base 108. This is in the form of a sharp edge. The cut edge 111 forms the opening edge of the cell cover 102. The casing 109 comprises an end segment 113 which widens radially outwardly and a second segment 117 with a smaller external diameter. The height of the end segment 113 is about 40% of the height of the casing 109. The diameter of the segment 117 corresponds essentially to the diameter of the circular base 108, and that of the segment 113 is slightly greater. The circumferential step 118 forms the boundary between the two segments.

Figure 1B:
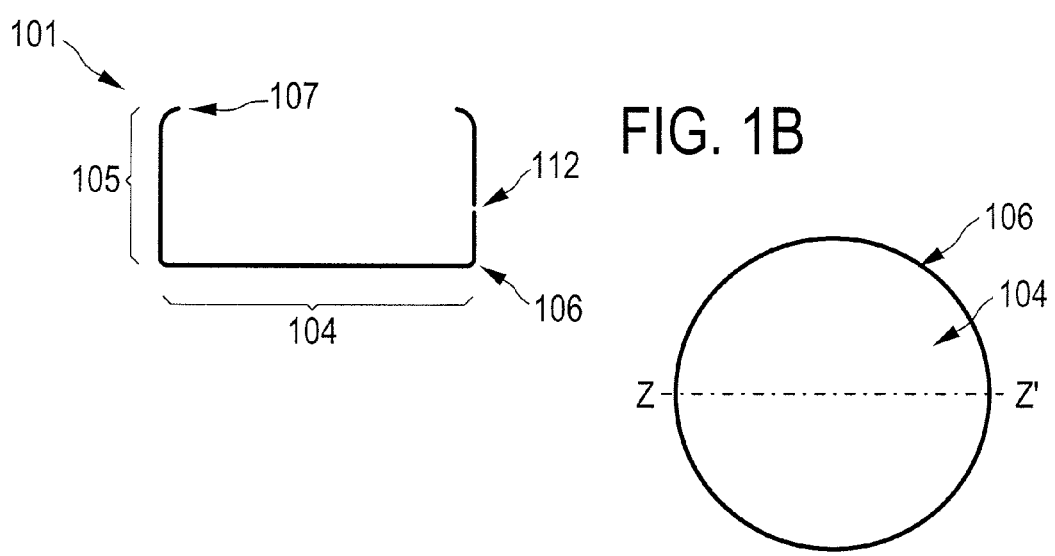

FIG. 1B schematically illustrates the cell cup 101 on the one hand in the form of a plan view from above (of the base of the cell cup 101) and on the other hand in the form of a cross-sectional illustration (section along the line Z-Z'). The cell cup 101 has a circular, planar base 104 and the cylindrical casing 105 with a circular cross section. The edge area 106 forms the junction between the casing 105 and the base 104. This is in the form of a sharp edge. The cut edge 107 forms the opening edge of the cell cup 101. This is curved inwardly such that the internal diameter of the casing 105 decreases towards the cut edge 107.

Figure 1C:
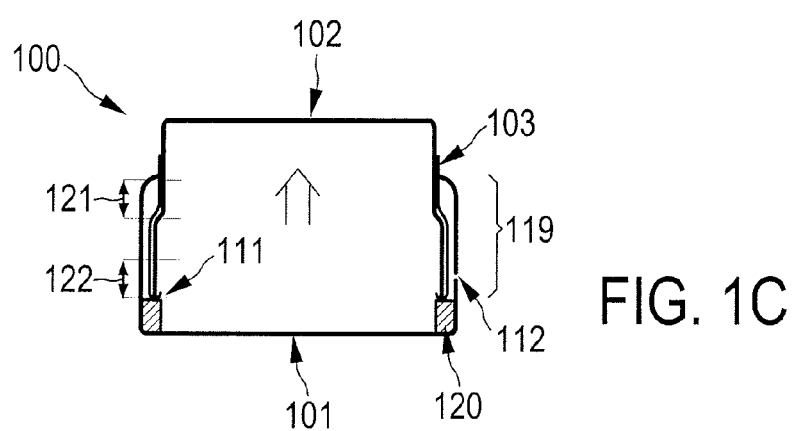

FIG. 1C illustrates a housing 100 assembled from the housing half parts illustrated in FIGS. 1A and 1B, for an example of my button cell. The seal 103 is arranged between the cell cup 101 and the cell cover 102 and isolates them from one another. The seal 103 is a film seal, as is described in DE 196 47 593. The cell cover 102 is inserted into the cell cup 101 with the cut edge 111 in front such that the casing 105 of the cell cup 101 and the casing 109 of the cell cover 102 overlap partially, and form the circumferential, double-walled casing area 119. The cut edge 111 of the cell cover 102 rests on the supporting ring 120 which is inserted into the cell cup 101.

On the one hand, the cell cup 101 and the cell cover 102 connect to one another with a force fit. Adhesion forces in each case exist between the two housing half parts 101 and 102 and the seal 103, and counteract the two half parts 101 and 102 sliding axially out of one another (in the direction of the arrow). Furthermore, the two half parts 101 and 102 also connect to one another in an interlocking manner in the axial direction, however. This is because, once again, that segment 113 which widens radially outwardly as well as the cut edge 107 curved inwardly of the cell cup 101 counteract them sliding out of one another in the axial direction. Since the external diameter of the segment 113 which widens radially outwardly is greater than the internal diameter of the casing 105 of the cell cup 101 in the area of the cut edge 107 which is curved inwardly, the cell cup 101 and the cell cover 102 can move apart from one another in the axial direction only until the segment 113, which widens radially outwardly, of the cell cover 102 meets the cut edge 107, which is curved inwardly, of the cell cup 101. They can then slide further out of one another in the axial direction only by deformation of the cell cup 101 and/or of the cell cover 102.

The width of the end, widened segment 113 is about 45% of the height of the casing 105 of the cell cup 101 and about 60% of the overlapping (double-walled) area 119 (when the cell cover 102 has been inserted completely into the cell cup 101). This means that the segment 113 can be moved to a limited extent in the axial direction (presupposing a force in the axial direction which exceeds the adhesion force between the components cell cup 101, cell cover 102 and seal 103). The cell cover 102, whose cut edge 111 is seated on the base of the cell cup 101, can be raised axially until the step 118 meets the cut edge 107, which is curved inwards. The cell cover 102 and the cell cup 101 in this case move relative to one another over a distance of about 40% of the height of the overlapping (double-walled) area 119 (corresponding to the distance 121). Lifting such as this can be caused in particular by an overpressure in the interior of the housing 100.

The relative movement of the cell cup 101 and cell cover 102 decreases the width of the circumferential double-walled casing area 119. Instead, the housing 100 now has only one wall in the area of the circumferential segment 122, whose width corresponds essentially to the distance 121.

The hole 112 passes through the casing 105 of the cell cup 101 precisely in this segment 122 and any overpressure which is present in the housing 100 can be dissipated through this hole 112 when or after the cell cover 102 is or has been raised. The housing half parts 101 and 102, which can be moved with respect to one another, act as a safety valve in conjunction with the hole 112.

FIG. 2A shows a button cell in the form of a partially sectioned, schematic illustration. FIG. 2B illustrates the seal area of the button cell as an enlarged detail. The illustration shows the cell cup 101 and the cell cover 102. In all their essential features, the cell cup 101 and the cell cover 102 correspond to the housing half parts illustrated in FIG. 1. For example, the cell cup 101 has the cut edge 107 curved inwardly, the cell cover 102 has the end segment 113 which widens radially outwardly. The seal 103 is arranged between the cell cup 101 and the cell cover 102 within the housing of the spirally wound electrode-separator assembly 114. The electrode-separator assembly 114 comprises the positive electrode 123 and the negative electrode 124, as well as the winding core 125. The positive electrode 123 connect to the base 104 of the cell cup 101 via the output conductor 115, which rests flat on the end face of the wound electrode-separator assembly 114. The output conductor 115 has a predetermined breaking point 116. Holes (112a, 112b) pass through the housing casing of the cell cup 101 at a plurality of points.

FIG. 3A illustrates a button cell as illustrated in FIG. 2, after overcharging has been deliberately brought about (schematic illustration). FIG. 3B shows the seal area of the button cell as an enlarged detail. Overpressure created as a consequence of the overcharging in the cell has led to the cell cover 102 being lifted through the distance 126. The cell cover has been lifted until the segment 113, which widens radially outwards, of the cell cover 102 has met the cut edge 107, which is curved inwardly, of the cell cup 101. The electrode-separator assembly 114 has also been lifted, with the cell cover 102. In this case, the output conductor 115 has broken through at the predetermined breaking point 116. The overpressure was able to escape through the holes 112a and 112b, which were exposed because of the lifting.

The invention claimed is:

1. A button cell having a housing closed in a liquid-tight manner comprising a cell cup, a cell cover and a seal wherein,
   the cell cup has a base, a circumferential casing, an edge area connecting the base and the casing, and an end cut edge curved radially inwardly such that an internal diameter of the casing of the cell cup decreases toward the cut edge,
   the cell cover is inserted into the cell cup with the cut edge in front such that the casing of the cell cup and the casing of the cell cover at least partially overlap and form a circumferential double-walled casing area,
   the cell cover has a base, a circumferential casing, an edge area connecting the base and the casing, and an end cut edge, the casing of the cell cover comprising a circumferential segment in the area which overlaps the casing of the cell cup, which segment widens radially outwardly and has an external diameter greater than the internal diameter of the casing of the cell cup in the area of the cup edge which is curved inwardly,
   the circumferential segment is an end segment relative to the cut edge of the cell cover or starting from the cut edge in a direction toward the base of the cell cover,
   the seal is arranged between the cell cup and the cell cover between the overlapping casing areas such that they are isolated from one another,
   at least one hole passes through the casing of the cell cup in the area which overlaps the casing of the cell cover, and the cell cup and the cell cover are moveable against each other in the axial direction to dissipate any overpressure within the cell.

2. The button cell according to claim 1, wherein the hole has a diameter of up to 2 mm.

3. The button cell according to claim 1, wherein the cut edge of the cell cover is seated on the base of the cell cup, and/or the cut edge of the cell cup rests on the outer wall of the casing of the cell cover.

4. The button cell according to claim 1, wherein the casing of the cell cup completely overlaps the casing of the cell cover.

5. The button cell according to claim 1, wherein the casing of the cell cup has a shorter height than the casing of the cell cover, between 35% and 90% of the height of the cell cover.

6. The button cell according to claim 1, wherein the casing of the cell cup and/or the casing of the cell cover have/has an essentially constant internal diameter in a direction of the respective cut edge.

7. The button cell according to claim 1, wherein the cut edge of the cell cup curves radially inwardly such that the internal diameter of the casing of the cell cup decreases towards the cut edge.

8. The button cell according to claim 7, wherein the casing of the cell cover comprises a circumferential segment in the area which overlaps the casing of the cell cup, which segment widens radially outwardly and whose external diameter is greater than the internal diameter of the casing of the cell cup in the area of the cut edge which is curved inwardly.

9. The button cell according to claim 8, wherein the height/width of the widened segment is 10% to 90% of the height of the casing of the cell cup.

10. The button cell according to claim 8, wherein the widened segment is an end segment extending as far as the cut edge of the cell cover.

11. The button cell according to claim 1, wherein the at least one hole is arranged, starting from the base of the cell cup, at a height of up to 90% of the overall height of the casing.

12. The button cell according to claim 1, wherein, within the housing, the button cell has an electrode-separator assembly in the form of a winding having at least one positive and at least one negative electrode, wherein the positive electrode connects via an output conductor to the housing cup via the base of the housing cup, and wherein the output conductor has at least one predetermined breaking point.

* * * * *